May 3, 1949.  S. W. FORD  2,469,068
AUTOMOBILE BODY CONSTRUCTION
Filed Dec. 16, 1943
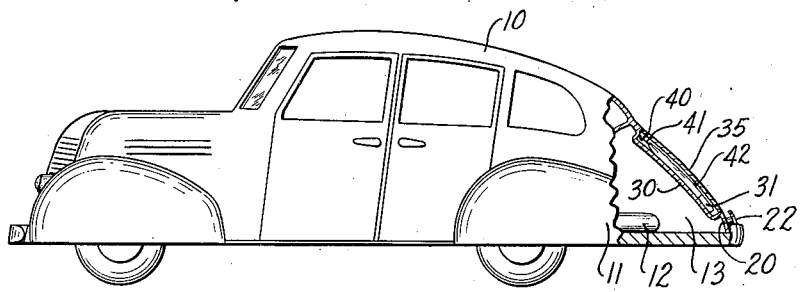
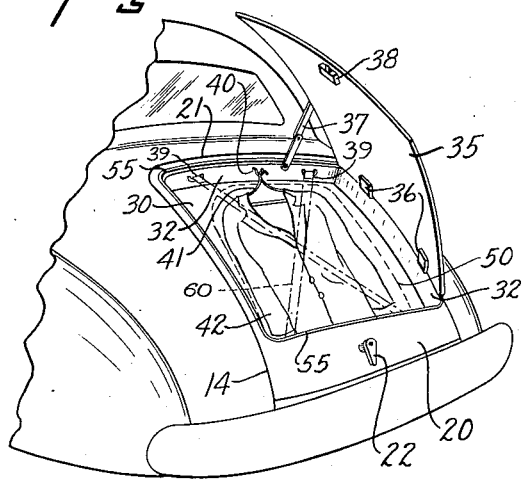
Inventor
Shelley W. Ford
By Marechal & Biebel
Attorneys Patented May 3, 1949

2,469,068

UNITED STATES PATENT OFFICE 2,469,068

AUTOMOBILE BODY CONSTRUCTION

Shelley W. Ford, Dayton, Ohio, assignor of one-half to J. Frederic Gagel, Dayton, Ohio Application December 16, 1943, Serial No. 514,480

2 Claims. (Cl. 296—37)

This invention relates to automobile bodies and more particularly to a construction which includes provisions for receiving and transporting clothes, without affecting the desired external appearance of the automobile body.

One of the principal objects of the invention is to provide a construction of automobile body in which the desired streamlined or other configuration of the body may be maintained, the general internal construction and luggage space of other compartments may likewise be maintained, and additional construction and arrangement within the body may be provided whereby a suit of clothes or the like may be hung in place upon a hanger so that it may be transported without undue or objectionable wrinkling and also may be adequately protected.

In the development of automobile bodies designers have been confronted with the desirability of providing a pleasing external contour or configuration, particularly the streamlined type of construction which has been most in vogue in recent years; and at the same time of maintaining adequate compartments or storage spaces such as have been provided generally in the rear of automobiles for the housing of a spare tire and for receiving luggage for a trip, and also various small compartments available in the part of the the body in which the passengers sit to provide small compartments for carrying gloves or other small packages.

An important feature of the present invention resides in the particular construction of the body whereby all of the usual elements of construction may be retained, along with various compartments which have heretofore been provided; and in addition a special construction is provided for the purpose of receiving unpacked clothes, such as a suit of clothes upon a coat hanger, within the usual and desired outer configuration of the body and without materially affecting the other compartment spaces heretofore provided.

In the drawing, in which like characters of reference designate like parts,

Fig. 1 is a diagrammatic, and illustrative, side view showing generally an automobile now in wide spread usage with the rear portion broken away and shown in section in order to illustrate the present invention; and Fig. 2 is an enlarged fragmentary view, in the nature of a perspective view, from the left rear of Fig. 1.

In the embodiment of the invention as shown, the body of the automobile is designated generally by the numeral 10, the rear portion being designated more particularly by the numeral 11. This rear portion 11 houses the rear compartment space which is provided for receiving an extra tire shown diagrammatically and designated 12 and also for receiving luggage or other packages to be transported.

This rear compartment space itself is designated by the numeral 13 and the opening in the automobile body through which entrance is gained to this compartment is designated by the numeral 14, shown more particularly in Fig. 2.

This opening 14 is provided with a cover portion 20, shaped to conform with the desired outside configuration of the automobile body and, as illustrated, is hinged along the top edge 21, of the entrance or opening to the compartment 13, by a suitable hinge means for connecting this portion 20 to the body of the automobile and raising it to elevated position in the well-known manner. The handle 22 for the locking means which holds this cover 20 in closed position is shown, the form of locking means and handle therefor being of any desired and usual construction as now used.

This cover 20, is provided with a spaced wall 30, which is stamped or otherwise formed integrally or rigidly connected to the cover 20 to thus provide a second comparatively shallow compartment or space 31 shown in cross section in Fig. 1, the side walls of which are indicated by numeral 32 in Fig. 2. This space 31 has the lower wall 30 thereof inclined and preferably curved to follow generally the curvature of the compartment door of cover 20. Also this space 31 is provided with a hinged cover 35 which, as shown, is hinged along one side by the use of conventional internal hinges, such for example as those used to hinge the cover 20 along its upper edge 21, these hinges being shown diagrammatically and indicated by the numeral 36. Also the cover 35 is provided with a type of pivoted or toggle linkage 37 of the usual construction whereby when the covering door 35 is swung upwardly to give access to the opening 31, this toggle linkage will act to support it in elevated position.

The cover 35 is provided with a suitable lock 38 which can be actuated by means of a handle such as the handle 22 or may be of the concealed type, as shown, so that it may be opened by means of its key and the smooth finished contour of the exterior of the rear end of the body will be unbroken by a protruding handle. Suitable reinforcing means (not shown) may be provided for the cover 35 to increase its strength, if desired, such as cross reinforcing members affixed to its under side.

Suitable means is provided, within the compartment 31, for receiving clothes upon a coat hanger or the like so that they may be suspended in the compartment; and, because the wall 30 is downwardly inclined following the general contour of the external contour of the rear end of the automobile body, the weight of the clothes will be sufficient to cause them to hang supported upon this curved wall and to be transported without such wrinkling as will result from packing clothes in a traveling bag and also so that the motion of the automobile has substantially no tendency to cause wrinkling or wear, jolts and jarring of the automobile having the effect of causing the clothes constantly to readjust to lie suspended upon the bottom wall 30, and thus to be kept in condition free from wrinkling. If desired, cross straps, indicated in dotted lines at 60, may be provided to limit movement of the clothes and prevent objectionable disarrangement or displacement as when the cover portion 20 is opened for access to the luggage storage compartment. The straps may be made satisfactorily of elastic or other suitable fabric and may be provided with hooks or snaps 39 at the ends to fasten to corresponding parts on the side walls of the compartment 31.

As shown the top wall of the opening of compartment 30 is provided with a hook 40, which is adapted to receive a coat hanger 41, which in turn, for illustrative purposes, is shown as supporting a man's suit indicated generally by the numeral 42.

By means of this arrangement the comparatively light cover 35 may be opened readily for access to the compartment 31 and a suit of clothes, or other wearing apparel may be placed in the compartment, upon a coat hanger and suspended from the hook 40, and thus may be transported without wrinkling and no objectionable wearing effect. If it is desired, of course, the bottom wall 30 of the compartment 31 may be covered with a suitable lining material which will present an adequately smooth and non-wearing surface for the clothes and thus protect the clothes from rough metal which might otherwise have a damaging effect. Likewise with the top cover 35 closed and locked with clothing properly suspended therein, the main cover 20 for the tire and baggage compartment 13 may be raised or lowered as desired to give access to that compartment and without effecting any objectionable disturbance of the clothes hanging in the compartment 31. And even if the raising or lowering of the cover 20 were to temporarily affect the hanging of the clothes in compartment 31 the construction is such that with the cover 20 in its normal closed position the motion of the automobile would tend to cause rearrangement of the clothes to leave them in proper suspended position from the hook 40 so that they would arrive at their destination substantially free from wrinkles.

Of course, the cover 35 is provided with proper sealing surfaces inside the compartment 31 so that when this cover is in closed position, water, dust and the like will be excluded in the same way as is now the case with rear compartments in automobiles, and the clothes thus properly protected. As shown, a flange or inwardly extending shoulder 55, which runs around the four sides of the compartment 31 and is indicated generally and designated by the numeral 55, and sponge rubber or other properly suitable sealing material carried by this flange for coaction with inner surface of the door may be used to effect the sealing result desired, or the sponge rubber may be attached to the inner surface of the door and may be brought into contact with the flange or shoulder to accomplish the same result.

If desired, the clothes could be enclosed in a protecting bag of paper or the like which would further prevent dust or other possible discoloring or staining of the clothes, such paper bag being indicated in dotted lines and marked with numeral 50.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An automobile body construction of the character described comprising a main body portion, a compartment for baggage and the like housed within said body portion, a cover for said compartment and connected to said body portion at one edge of said compartment and hinged thereto by concealed hinges located to permit swinging of the cover about a horizontal axis for opening and closing movement, a locking means carried by said cover and located adjacent the edge opposite to said hinge connection and operable to be moved to unlocking position for opening of the cover and to locked position to hold the cover in closed position, said cover having a dished and inwardly stamped portion comprising an integral wall to form a compartment therein for receiving a suit of clothes and the like suspended in an inclined position upon the bottom wall of said compartment, means within said compartment to support said clothes, and a second cover for said clothes receiving compartment movably connected to said first cover by concealed hinges mounted along a side edge of the compartment to permit movement of said second cover to open or close the second compartment without disturbing the first cover, means for fastening said second cover in closed position, means for holding said second cover in elevated position to give access to the second compartment, said second cover when in closed position being substantially flush with and in continuation of the external surface of said main cover, said first and second cover having cooperating means for protecting said compartment against weather conditions when closed, and the construction being such that when both said covers are in closed position they conform to the external surface of the automobile body.

2. An automobile body construction of the character described comprising a main body portion, a compartment for baggage and the like housed within the rear of said body portion, a cover for said compartment hinged to said body portion at one edge of said compartment to provide for swinging of the cover about a horizontal axis for opening and closing movement, a locking means carried by said cover and located adjacent the edge opposite to said hinge connection and operable to be moved to unlocking position for opening of the cover and to locked position to hold the cover in closed position, said cover having an inwardly-formed integral portion comprising an inclined wall enclosed on all sides by side walls and spaced from said cover to provide a separate and completely enclosed compartment within said baggage compartment.

for receiving a suit of clothes and the like suspended and supported in an inclined and substantially wrinkle-free position upon said inclined wall of said clothes-receiving compartment, means within said clothes-receiving compartment to support said clothes, and a second cover for said clothes-receiving compartment movably connected to said first cover to provide for movement of said second cover to open and close said clothes-receiving compartment without disturbing said first cover, means for fastening said second cover in closed position, means for holding said second cover in elevated position to provide access to said clothes-receiving compartment, said second cover when in closed position being substantially flush with and in continuation of the external surface of said first cover, said first and second cover having cooperating means for protecting said compartments against weather conditions when closed, and the construction being such that said covers in closed position conform to the external surface of the automobile body.

SHELLEY W. FORD.

REFERENCES CITED

The following references are of record in the file of this patent:

UNITED STATES PATENTS

| Number | Name | Date |
|---|---|---|
| 1,434,350 | Collins | Oct. 31, 1922 |
| 1,473,161 | Rogers | Nov. 6, 1923 |
| 1,815,656 | McMurray | July 21, 1931 |
| 1,927,735 | Carlisle | Sept. 19, 1933 |
| 1,980,210 | Kroll | Nov. 13, 1934 |
| 2,109,665 | Fergueson | Mar. 1, 1938 |
| 2,236,428 | Haas | Mar. 25, 1941 |

FOREIGN PATENTS

| Number | Country | Date |
|---|---|---|
| 224,592 | Great Britain | Aug. 13, 1923 |
| 467,714 | Great Britain | June 22, 1937 |
| 495,603 | Great Britain | Nov. 16, 1938 |
| 679,698 | France | Apr. 16, 1930 |

OTHER REFERENCES

"Automotive Industries," Oct. 31, 1936.